US011757321B2

(12) United States Patent
Fatemi et al.

(10) Patent No.: US 11,757,321 B2
(45) Date of Patent: Sep. 12, 2023

(54) ROTARY ELECTRIC MACHINE WITH STATOR ASSEMBLY HAVING STATOR SLOTS LINED WITH MULTIPLE MOLDING MATERIALS

(71) Applicant: GM GLOBAL TECHNOLOGY OPERATIONS LLC, Detroit, MI (US)

(72) Inventors: Alireza Fatemi, Canton, MI (US); Anthony M. Coppola, Rochester Hills, MI (US); Farzad Samie, Franklin, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 17/405,480

(22) Filed: Aug. 18, 2021

(65) Prior Publication Data
US 2023/0054794 A1 Feb. 23, 2023

(51) Int. Cl.
*H02K 3/24* (2006.01)
*H02K 3/28* (2006.01)
*H02K 3/30* (2006.01)
*H02K 1/16* (2006.01)
*H02K 3/12* (2006.01)
*H02K 1/20* (2006.01)
*H02K 3/34* (2006.01)

(52) U.S. Cl.
CPC .............. *H02K 3/24* (2013.01); *H02K 1/165* (2013.01); *H02K 1/20* (2013.01); *H02K 3/12* (2013.01); *H02K 3/28* (2013.01); *H02K 3/30* (2013.01); *H02K 3/345* (2013.01)

(58) Field of Classification Search
CPC ............ H02K 1/16; H02K 1/165; H02K 1/20; H02K 3/12; H02K 3/24; H02K 3/28; H02K 3/30; H02K 3/345
USPC ........................................ 310/179, 181, 184
See application file for complete search history.

(56) References Cited

U.S. PATENT DOCUMENTS

| 6,069,430 A * | 5/2000 | Tsunoda | H02K 3/40 |
| | | | 174/120 SR |
| 6,323,625 B1 * | 11/2001 | Bhargava | F02C 7/268 |
| | | | 322/32 |
| 2019/0149023 A1 * | 5/2019 | Weber | H02K 5/08 |
| | | | 310/216.069 |
| 2020/0161917 A1 * | 5/2020 | E Silva | H02K 9/197 |

(Continued)

*Primary Examiner* — Rashad H Johnson
(74) *Attorney, Agent, or Firm* — Quinn IP Law

(57) ABSTRACT

A stator assembly for an electric machine includes stator teeth connected to a stator yoke to form a stator core. Adjacent teeth define a stator slot. Stator windings are disposed within the slot. A molding material fills the slot around the windings, providing a desired thermoelectrical performance level at different slot regions, including electrical insulation, thermal conductivity, and/or electrostatic shielding levels. A method insulates the stator assembly by inserting a molding tool(s) into the slot to define a void volume, filling the void volume with the dielectric molding material, and curing the dielectric molding material to form a slot liner layer adjacent to the tooth walls. A slot opening between adjacent teeth is filled with an electrically-conductive resin to form an electrostatic shielding layer. An electrical system includes an AC voltage bus connected to a power inverter module and to the electric machine having the above-described stator assembly.

20 Claims, 3 Drawing Sheets

(56) References Cited

U.S. PATENT DOCUMENTS

| | | | |
|---|---|---|---|
| 2021/0036568 A1* | 2/2021 | Schulz | H02K 3/12 |
| 2021/0143693 A1* | 5/2021 | Nehl | H02K 3/24 |
| 2021/0249926 A1* | 8/2021 | Enomoto | H02K 3/34 |
| 2021/0367483 A1* | 11/2021 | Yin | H02K 3/34 |
| 2021/0367494 A1* | 11/2021 | Takahashi | H02K 1/2788 |
| 2021/0384787 A1* | 12/2021 | Okamoto | H02K 15/024 |
| 2022/0014062 A1* | 1/2022 | Almeida E Silva | H02K 9/227 |
| 2022/0181935 A1* | 6/2022 | Tamura | H02K 3/28 |
| 2022/0200426 A1* | 6/2022 | Gohn | H02K 1/276 |

* cited by examiner

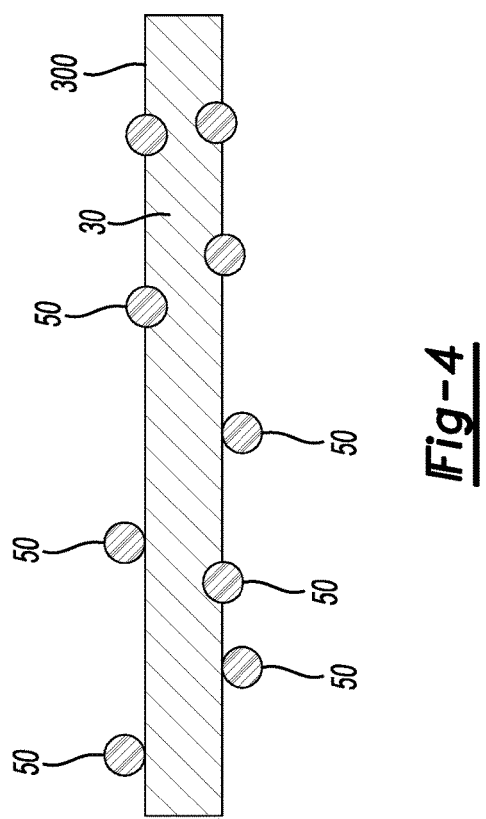
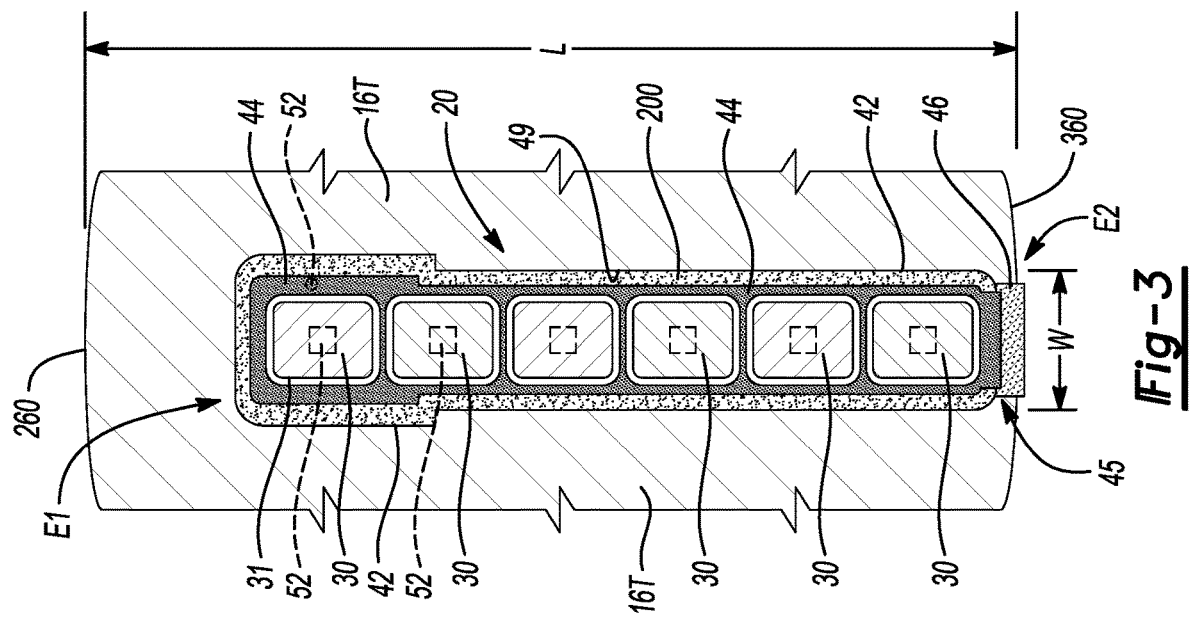

1

ROTARY ELECTRIC MACHINE WITH STATOR ASSEMBLY HAVING STATOR SLOTS LINED WITH MULTIPLE MOLDING MATERIALS

INTRODUCTION

Electric traction motors and motor generator units, commonly referred to in the art as rotary electric machines, are used to perform work in a wide variety of electromechanical systems. For example, high-voltage electric motors are often used in electrified vehicles and other electrified systems to generate torque, e.g., for powering road wheels, drive belts, or revolute joints, while high-voltage generators are used to generate electricity. Such electric machines include a rotating member/rotor that is spaced a short distance apart from a surrounding stationary member/stator. In a stator assembly, multiple stator teeth are attached to a cylindrical stator yoke. The stator teeth project radially toward the rotor, which is typically disposed along a centerline of the stator assembly.

Further with respect to stator assembly construction, adjacent stator teeth are separated from each other by a respective stator slot. The various stator slots are filled with electrically conductive wires or solid bar conductors to form stator windings. In an exemplary polyphase/alternating current (AC) rotary electric machine, an AC input voltage is applied to the stator windings from a power inverter module. Interaction between a magnetic field of the rotor and a rotating magnetic field of the energized stator windings ultimately generates push-pull forces within a rotor-stator airgap. The resulting rotation of the rotor about its axis of rotation is then harnessed and directed to a coupled load.

SUMMARY

The present disclosure relates to improved slot insulation techniques for constructing a rotary electric machine, with the electric machine exemplified herein as an electric propulsion motor. Sustained operation of an electric machine of the type described above results in substantial amounts of heat. Heat is particularly prevalent during sustained operation of the electric machine at high rotational speeds and/or output torque levels. Heat that is generated and retained within the structure of the stator assembly eventually degrades electrical insulation on the stator windings, ultimately compromising machine performance. While thermal management systems are commonly used to regulate machine temperature, such as by a controlled circulation of a suitable heat transfer fluid through the electric machine, additional features as set forth herein may be incorporated into the slot construction of the stator assembly to further optimize electrical and thermal performance.

In a particular approach, the slot insulation methodology contemplated herein includes the targeted use of molding materials collectively providing a predetermined thermal and/or electrical ("thermoelectrical") performance level in different regions of the stator slots, including two or more of electrical insulation, thermal conductivity, or electrostatic shielding. To this end, the molding compounds used to construct the molding materials each have different material compositions. The different molding compounds may separately provide ground wall insulation, improved slot region thermal conductivity, and optional electrostatic shielding of the rotor.

Also as detailed herein, aspects of the proposed solutions may be selectively implemented on existing/previously manufactured electric motor hardware for the purpose of increasing the operating voltage of such a motor. By way of example and not of limitation, representative embodiments of the electric machine include nominal 400V propulsion motors, e.g., for battery electric, hybrid electric, or other electrified motor vehicles, which using the present targeted slot insulation teachings could be modified to perform at a nominal 800V level. Thus, a propulsion motor rated for a first voltage could be retrofitted as detailed herein to function at a higher second voltage, possibly including implementations in which the second voltage is about twice the first voltage.

As appreciated in the art, stator winding insulation for conductors of an electric motor, e.g., of types commonly employed as electric propulsion motors for electrified vehicles and other mobile platforms, tend to rely on paper slot liners to provide ground wall insulation in electromagnetically active regions of the stator assembly. Additionally, enamel may be applied directly to the stator windings, with dielectric separators and varnish likewise included on a weld-side of such stator windings. The varnish used within the stator slots, primarily for mechanical reasons, often contains small air pockets or voids, which may collectively result in partial discharge events at lower operating voltages.

The present insulation solutions rely on established manufacturing processes to transfer molding compounds having fundamentally different material properties. In the various embodiments detailed below, the molding compounds include at least two of: (i) a first molding compound ("slot liner layer") having a high dielectric strength, with the slot liner layer providing the above-noted ground wall insulation properties, (ii) a second molding compound ("slot fill layer") with a high thermal conductivity, which fills void volume areas within the stator slots and thereby reduces thermal interface resistance as well as partial discharges, and (iii) a third molding compound ("electrostatic shield layer") having a high electrical conductivity to electromagnetically shield the magnetic rotor from the proximate stator windings, and to thus reduce parasitic voltages that may be induced within the rotor.

In a representative embodiment, a stator assembly is described herein having a stator core. The stator core has a cylindrical stator yoke connected to or formed integrally with radially-projecting stator teeth. The stator assembly also includes stator windings and multiple molding materials. In this embodiment, the stator yoke, and thus the stator assembly, defines a center opening, and has a longitudinal center axis, an outer diameter surface, and an inner diameter surface. The stator teeth are connected to the stator yoke and radially project into the center opening, i.e., toward the center axis. The stator teeth collectively define stator slots extending radially from the inner diameter surface toward the outer diameter surface of the stator yoke. The stator windings are disposed within the stator slots along with the above-noted molding materials. The molding materials are situated within each respective one of the stator slots, thus substantially filling the various void volumes present around the stator windings within the stator slots.

The molding materials include the slot liner layer adjacent to and in contact with tooth walls of adjacent stator teeth, with the slot liner layer being constructed of a dielectric molding compound. The slot fill layer in turn is in contact with and surrounds the stator windings. The slot fill layer may be constructed of a thermally-conductive molding compound, which in some embodiments could be the same or a similar material as that of the dielectric molding compound of the slot liner layer.

The dielectric molding compound may be constructed of a thermosetting polymer material having a dielectric strength of at least about 20 kV/mm. The dielectric molding compound may have, in some configurations, a thermal conductivity of less than about 10 W/mK, e.g., 0.75 W/mK or more. The slot fill layer may have a thermal conductivity of at least about 1 W/mK, with other possible values and ranges thereof provided herein.

The thermally conductive molding compound of the slot fill layer may be a thermosetting polymer, itself possibly containing a conductive filler and having a thermal conductivity of at least about 1 W/mK, or more than about 5 W/mK in different possible embodiments.

Each adjacent pair of the stator teeth is separated by an arcuate slot opening in some configurations of the stator assembly. In other configurations the slot openings are closed, i.e., the stator assembly is characterized by an absence of the slot openings. The multi-layer slot fill material in embodiments in which the slot openings are present and open may include the electrostatic shielding layer. The electrostatic shielding layer in turn is constructed of a paramagnetic or non-magnetic material and disposed within the slot opening.

An aspect of the disclosure includes the stator assembly having an electrically-insulating paper liner positioned adjacent to the stator teeth within the stator slots. In some configurations, electrically-nonconductive spacers, e.g., dielectric polymers shaped as particles, spheres, or balls, are disposed between the stator windings and the stator core, i.e., the stator yoke or the stator teeth.

Coolant channels may be optionally disposed within the stator slots, such as in the multi-layer molding material and/or the stator windings. In such an embodiment, the coolant channels are configured to connect to a coolant supply and convey heat transfer fluid or coolant to the stator assembly.

Also disclosed herein is a method for insulating a stator assembly for a rotary electric machine. A representative embodiment of such a method includes inserting a first molding tool into a stator slot of a stator core of the stator assembly to define a first void volume between the first molding tool and tooth walls of an adjacent pair of stator teeth of the stator core, and filling the first void volume with a dielectric molding compound. The method also includes curing the dielectric molding compound to form a slot liner layer adjacent to the tooth walls, removing the first molding tool from the stator slot to form a second void volume within the stator slot, and inserting conductive stator windings into the second void volume. This embodiment of the method further includes filling the second void volume with a thermally-conductive molding compound and curing the thermally-conductive molding compound to form a slot fill layer surrounding the conductive stator windings.

Another aspect of the disclosure pertains to an electrical system having a power inverter module connectable to a direct current (DC) voltage bus, and operable for outputting an alternating current (AC) output voltage in response to a DC input voltage. The electrical system also includes an AC voltage bus connected to the power inverter module, and a rotary electric machine connected to the AC voltage bus. The rotary electric machine has a stator assembly inclusive of a stator yoke defining a center opening, and having a longitudinal center axis, an outer diameter surface, and an inner diameter surface, and a plurality of stator teeth connected to the stator yoke to form a stator core.

The stator teeth project radially into the center opening toward the longitudinal center axis and collectively define stator slots. The stator slots extend radially from the inner diameter surface toward the outer diameter surface of the stator core yoke. Stator windings disposed within the stator slots. A molding material is disposed within and substantially fills the stator slots around the stator windings, and provides a predetermined insulation performance at different regions of the stator slots. In this embodiment, the molding material provides two or more predetermined performance levels of electrical insulation, thermal conductivity, or electrostatic shielding.

The molding material include a slot liner layer adjacent to and in contact with a stator wall of the stator teeth, with the slot liner layer being constructed of a dielectric molding compound having a dielectric strength of at least about 20 kV/mm, and a slot fill layer surrounding the stator windings. The slot fill layer is constructed of a thermally conductive molding compound having a thermal conductivity of at least about 1 W/mK.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a cross-sectional illustration of a portion of the stator assembly of FIG. 2 depicting a representative stator slot lined and filled with the molding materials.

FIG. 4 is a cross-sectional illustration of a conductor of a representative stator winding, with the conductor equipped with electrically non-conductive spacing particles in accordance with an aspect of the disclosure.

Figure 1:
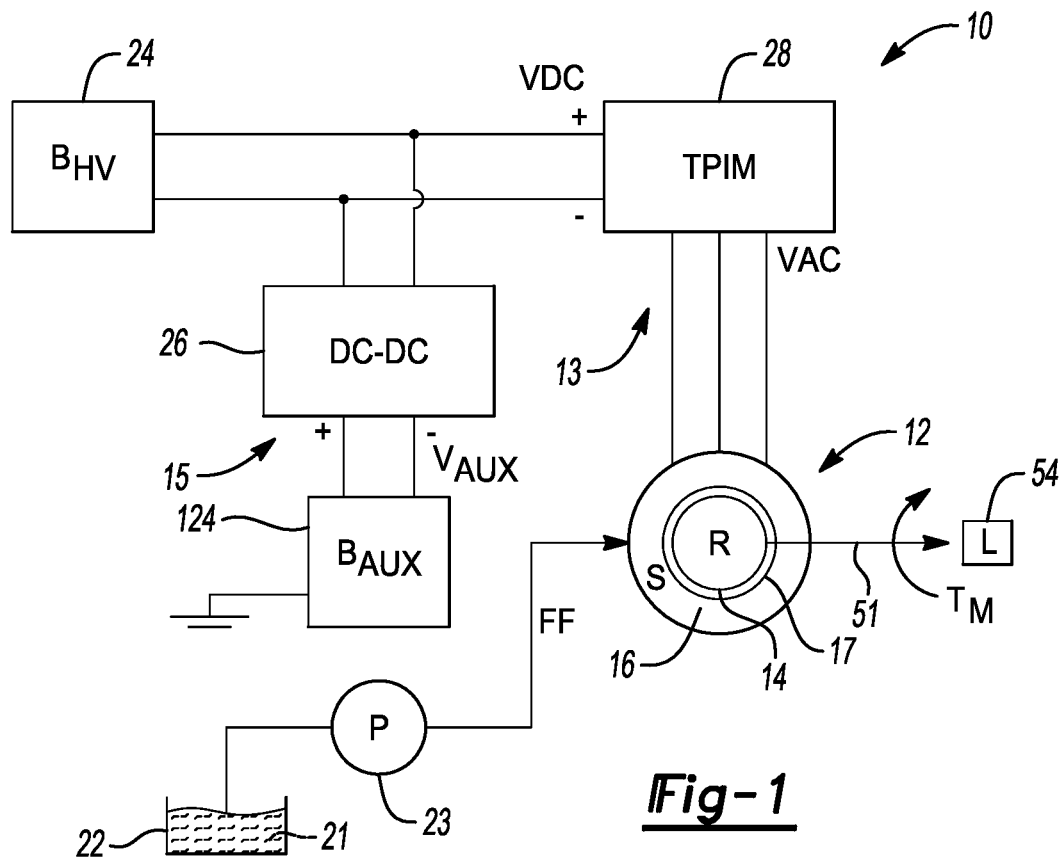
FIG. 1 is a schematic illustration of an exemplary electrical system having a rotary electric machine with a stator assembly that incorporates the molding materials described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within ±5% of", or "within acceptable manufacturing tolerances", or logical combinations thereof.

Referring to the drawings, wherein like reference numbers refer to the same or like components in the several Figures, an electrical system 10 is depicted schematically in FIG. 1. The electrical system 10 includes a rotary electric machine 12 having a rotor assembly ("R") 14 and a stator assembly ("S") 16, the stator assembly 16 of which is equipped with the molding materials 40 described in detail below with particular reference to FIG. 3. The respective rotor and stator assemblies 14 and 16 are separated in this embodiment by a radial airgap 17.

The improvements described in detail below are directed to the construction of the stator assembly 16, and therefore the rotor assembly 14 is not described in detail. However, those skilled in the art will appreciate that the rotor assembly 14 may be optionally embodied as a ferrous/magnetic cylinder to which is attached, or within which is embedded, a set of permanent magnets, with each permanent magnet being constructed of, e.g., ferrite, neodymium iron boron ("NdFeB"), samarium cobalt ("SmCo"), or another application-suitable magnet material. In other configurations the rotor assembly 14 may operate as a reluctance rotor, and therefore the use of such permanent magnets is not necessary within the scope of the disclosure. That is, the construction of the rotor assembly 14 may vary with the particular application, and therefore the depiction in FIG. 1 is representative of just one possible construction.

Figure 2:
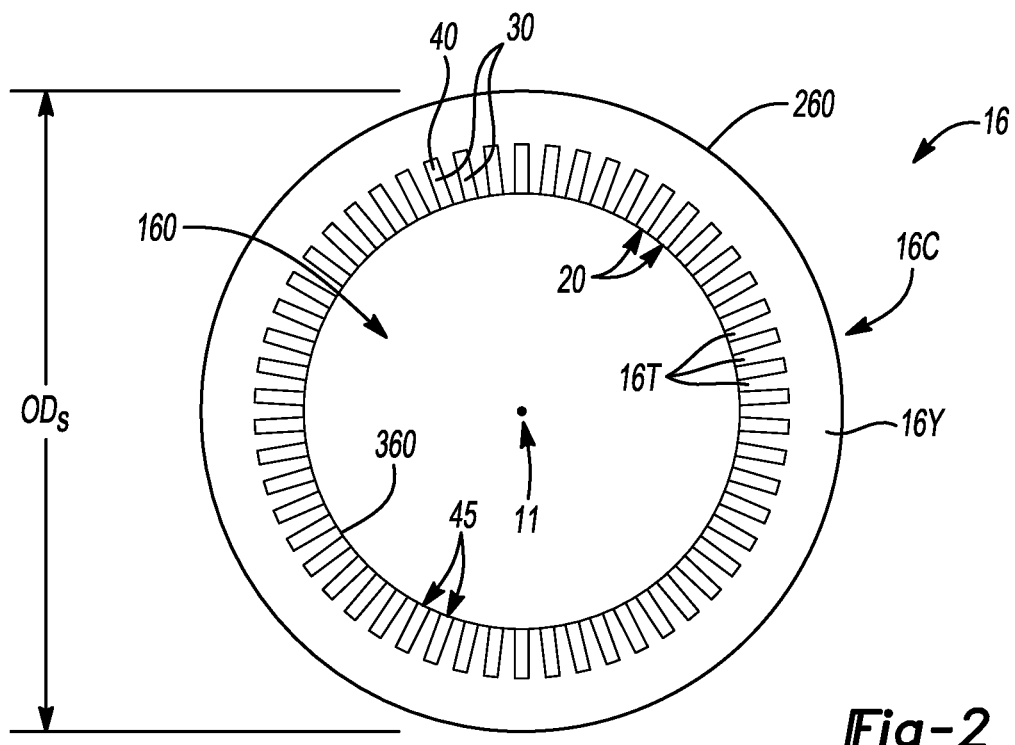
FIG. 2 is a schematic plan view illustration of a stator assembly depicting a stator yoke and stator teeth, with stator slots located between adjacent stator teeth filled by the molding materials of the present disclosure.

The stator assembly 16 as described herein is equipped with the molding materials shown generally at 40 in FIGS. 2 and 3. As appreciated in the art, the stator assembly 16 may produce substantial heat at times, such as during sustained high-power/high-torque operating modes of the rotary electric machine 12. The present teachings are intended to reduce the operating temperature, improve operation, and extend the life of the stator assembly 16, with some embodiments described below also enabling one to retrofit an existing rotary electric machine 12 using the present teachings so as increase an excitation voltage, e.g., from a nominal 400V level to a nominal 800V level as noted above.

In a typical embodiment of the electrical system 10, an application-suitable heat transfer fluid 21, e.g., automatic transmission fluid, diluted ethylene glycol mixture, or other suitable coolant may be stored in a sump 22 and circulated through the rotary electric machine 12, such as by operation of a coolant pump ("P") 23. The resulting flow of the heat transfer fluid 21 is indicated schematically in FIG. 1 by arrow FF, with embodiments described below and shown in FIG. 3 possibly directing the heat transfer fluid 21 through multiple stator slots 20 (see FIG. 2) of the stator assembly 16 for such a purpose.

Within the exemplary electrical system 10 depicted in FIG. 1, the rotor assembly 14 is arranged concentrically within the stator assembly 16, i.e., the stator assembly 16 circumscribes and thus surrounds the rotor assembly 14 as shown. The rotary electric machine 12 would thus embody a radial flux-type machine, and the above-noted airgap 17 would be a radial stator-rotor airgap in this particular embodiment. Other possible configurations of the rotary electric machine 12 may be realized in which the relative positions of the rotor assembly 14 and the stator assembly 16 are reversed, such that the rotor assembly 14 circumscribes and surrounds the stator assembly 16. For illustrative consistency, the representative embodiment of FIG. 1 in which the rotor assembly 14 resides radially within the stator assembly 16 will be described hereinafter without limiting the construction to such a configuration.

The electrical system 10 of FIG. 1 is shown in a possible configuration as a representative propulsion system, e.g., for an electrified motor vehicle, robot, or other mobile platform (not shown). In such an embodiment, the electrical system 10 includes an alternating current ("AC") voltage bus 13 selectively energized via a traction power inverter module ("TPIM") 28. This occurs by operation of a high-voltage battery pack ("$B_{HV}$") 24, for instance a multi-cell lithium ion, lithium sulfur, nickel metal hydride, or another suitable high-energy voltage supply. The AC voltage bus 13 carries an AC voltage ("VAC") to/from individual phase windings of the rotary electric machine 12 as needed to generate output torque (arrow $T_M$). The output torque (arrow $T_M$) from the energized rotary electric machine 12, when operating in a drive mode or a motoring mode, is ultimately imparted to a connected rotor shaft 51 and directed to a coupled load ("L") 54, such as by not necessarily limited to one or more road wheels of the above-noted exemplary electrified vehicle, or alternatively a propeller shaft, drive belt, revolute joint, or other component of a stationary or mobile system.

Still referring to FIG. 1, the electrical system 10 may also include a DC voltage bus 15 to which is connected a direct current-to-direct current ("DC-DC") converter 26, e.g., an auxiliary power module. The DC-DC converter 26 is configured to reduce or increase a relatively high DC voltage ("VDC") as needed via internal semiconductor-based switching and filtering operations, as will be appreciated by those of ordinary skill in the art. The DC-DC converter 26 is connected between the battery pack 24 and the TPIM 28 via positive (+) and negative (−) rails or terminals of a high-voltage side of the DC voltage bus 15. In some configurations, a low-voltage/auxiliary battery pack ("$B_{AUX}$") 124 may be connected to positive (+) and negative (−) rails or terminals of a low-voltage side of the DC voltage bus 15, with the auxiliary battery pack 124 possibly embodied as a lead-acid battery or a battery constructed of another application-suitable chemistry and configured to store or supply a 12-15V auxiliary voltage ("$V_{AUX}$") to one or more connected auxiliary devices (not shown).

Referring now to FIG. 2, the stator assembly 16 of the exemplary rotary electric machine 12 described above with reference to FIG. 1 may be constructed from a stack-up of annular, thin lamination ("lam") layers of electrical steel or another ferrous material, e.g., 2-5 mm thick per lam, as will be appreciated by those of ordinary skill in the art. The stator assembly 16 also has a plurality of stator teeth 16T each projecting radially from a cylindrical stator yoke 16Y having an outer diameter (ODs). In turn, the stator yoke 16Y, and thus the stator assembly 16, has an outer diameter surface 260 and an inner diameter surface 360, and surrounds a center opening 160 defined by the stator yoke 16Y. The stator teeth 16T extend radially inward toward a longitudinal center axis 11 of the stator assembly 16, with the longitudinal center axis 11 in the illustrated FIG. 1 configuration also serving as the axis of rotation of the rotor shaft 51. The stator yoke 16Y and the stator teeth 16T thus form a stator core 16C.

As shown in FIG. 2, each adjacent pair of stator teeth 16T is separated by a corresponding stator slot 20. That is, each stator slot 20 is defined and flanked by an adjacent pair of the stator teeth 16T. Electrically-conductive stator windings 30, details of which are omitted from FIG. 2 for illustrative simplicity and clarity, are positioned within the stator slots 20. An exemplary embodiment of the stator windings 30 is described below with reference to FIG. 3, with the stator windings 30 in the various implementations taking the form of electrically conductive wires or bar segments, typically but not necessarily constructed of copper. The individual stator windings 30 are ultimately connected to, and electrically energized by, the AC voltage bus 13 of FIG. 1. Within the scope of the present disclosure, each one of the stator slots 20 is lined and/or filled with a multi-layer molding material 40, the construction of which will now be described in detail with reference to FIGS. 3-5.

FIG. 3 illustrates a representative stator slot 20 constructed in accordance with the present teachings. In particular, multiple different polymeric molding compounds are used in the construction of the multi-layer molding material 40 to optimize performance, specifically in terms of improved ground wall insulation and thermal conductivity in specific regions of the stator slot 20, and also in terms of increased electrostatic shielding proximate the airgap 17 of FIG. 1. As depicted, the stator slot 20 has a width (W) and a length (L). The length (L) extends from a first end E1 of the stator slot 20 proximate the outer diameter surface 260 of the stator yoke 16Y, to a second end E2 adjacent to and possibly contiguous with or opening to the inner diameter end 360. Thus, a volume defined by the stator slot 20 is bounded by the width (W), length (L), and a depth of the slot 20, i.e., the axial length of the stator assembly 16 of FIGS. 1 and 2, as will be appreciated by those of ordinary skill in the art. Such a slot volume is predominantly but not completely occupied by the stator windings 30, with the remaining slot volume substantially occupied by the molding materials 40 of the present disclosure.

As contemplated herein, the molding materials 40 provide different predetermined levels of electrical insulation and thermal conductivity performance within the various stator slots 20. To this end, each respective molding compound used in the construction of the molding materials 40 is injected or otherwise applied in a specific corresponding region of the stator slot 20, for a designated purpose, in order to optimize thermal and electrical properties in a region-specific manner within each of the stator slots 20.

In a possible embodiment, the molding materials 40 form a slot liner layer 42 located immediately adjacent to and in contact with the stator teeth 16T, i.e., coating or lining the slot tooth walls 200 thereof. Molding materials 40 suitable for constructing the slot liner layer 42 in a possible construction of the stator assembly 16 of FIGS. 1 and 2 include dielectric molding compounds that are in an uncured and moldable state prior to molding with the stator assembly 16. In a possible implementation, the slot liner layer 42 may be constructed from a thermosetting polymer material having a dielectric strength of at least about 20 kV/mm. In some configurations, the molding materials 40 of the slot liner layer 42 may have a thermal conductivity of less than about 10 W/mK. Exemplary molding materials include, but are not necessarily limited to, epoxy, phenolic, polyurethane, silicone, acrylic, polyester, bismaleimide, benzoxanine, etc. Although not strictly necessary, such molding materials may be optionally filled with a solid particle material or short fibers, e.g., glass fibers, silica, oxides of aluminum, silicon, etc., nitrides, or other suitable structural reinforcement materials.

The slot fill layer 44 shown in FIG. 3 is disposed between the stator windings 30 and the above-noted slot liner 42, with the slot fill layer 44 surrounding the stator windings 30. A small airgap 31, the size of which is exaggerated in FIG. 3 for illustrative clarity, may be present between the stator windings 30 and the adjacent slot fill layer 44, e.g., due to tooling (FIG. 5) and to enable sufficient room for installing the stator windings 30. The slot fill layer 44 as contemplated herein is constructed of a thermally conductive molding compound, for instance a thermosetting polymer containing a conductive particle filler and having a thermal conductivity of at least about 1 W/mK, or more than about 5 W/mK in other configurations.

The molding materials 40 used to construct the slot fill layer 44 may be of generally the same class as the molding materials 40 used to construct the slot liner layer 42. However, the particle filler of the polymeric molding compound used in the slot fill layer 44 is specifically conductive, i.e., non-dielectric. As such, suitable electrically conductive materials include aluminum, copper, nickel, tin, iron, silver, gold, and various alloys. Other suitable materials include carbon-based materials such as carbon black, nanotubes, graphene, diamond, etc.

To reduce costs and simplify manufacturing, it may also be possible to use the same materials to construct the slot liner layer 42 and the slot fill layer 44. In such an embodiment, the molding materials of the slot liner layer 42 and the slot fill layer 44 may be added to the stator slots 20 in the same manufacturing step, thereby simplifying and streamlining the manufacturing process. Even if the same or a similar polymer is used everywhere, molding will proceed in two steps: (1) a first molding process occurs prior to insertion of the stator windings 30 to form the slot liner layer 42, and (2) a second molding process occurs after the insertion of the stator windings 30, as set forth below with reference to FIG. 5.

In certain embodiments, each adjacent pair of the stator teeth 16T is separated by an arcuate slot opening 45 along the inner diameter surface 360, with the slot openings 45 likewise depicted in FIG. 2. When the slot openings 45 are open, the multi-layer molding material 40 may include an electrostatic shielding layer 46 disposed within the slot opening 45. The electrostatic shielding layer 46 may be constructed of an austenitic or electrically-conductive paramagnetic material, e.g., an electrically conductive polymer for each of molding.

In constructions in which the slot openings 45 are initially present, closing the slot openings 45 using the electrostatic shielding layer 46 helps to reduce parasitic losses, as the hardened/cured electrostatic shielding layer 46 effectively functions as Faraday shield. Absent the electrostatic shielding layer 46, that is, flux leakage paths would exist that could degrade performance of the rotor assembly 14 of FIG. 1, as lams of the stator assembly 16 are ferromagnetic. Optionally, the multi-layer molding material 40 may include a paper liner 49 positioned adjacent to the tooth walls 200 of the stator teeth 16T within the stator slot 20 and functioning as electrical insulators, with options for working with embodiments having such insulating paper 49 described below with reference to FIG. 5.

Still referring to FIG. 3, various embodiments may be contemplated within the scope of the disclosure that include two or more of the above-described layers, i.e., the slot liner layer 42, the slot fill layer 44, or the electrostatic shielding layer 46. In one such embodiment, the stator slot 20 may be molded as depicted in FIG. 3, i.e., the slot liner layer 42, the slot fill layer 44, and the electrostatic shielding layer 46.

Alternatively, one may line each of the stator slots 20 with the paper liners 49, or may retrofit a stator assembly 16 already having such paper liners 49. In either case, the stator slots 20 may be molded with the slot fill layer 44 and the electrostatic shielding layer 46. Such an embodiment would thus include two layers, i.e., the slot fill layer 44 and the electrostatic shielding layer 46, along with the aforementioned paper liners 49, the latter of which may be considered to be, in effect, an additional layer of the multi-layer molding material 40.

In yet another embodiment, the stator assembly 16 of FIGS. 1 and 2 may be characterized by an absence of the arcuate slot openings 45. That is, adjacent tips of the various stator teeth 16T may be abutted or joined to one another, or integrally formed, such that the stator slots 20 are closed on both ends E1 and E2. Such an embodiment may utilize the slot liner layer 42 and the slot fill layer 44, forgoing use of the electrostatic shielding layer 46, for a total of two layers.

As will be appreciated by those skilled in the art in view of the disclosure, implementations of the present teachings could include providing a baseline stator assembly 16 with the above-noted insulating paper liners 49 installed in the stator slots 20. In a representative embodiment, the rotary electric machine 12 of FIG. 1 may be configured as an electric propulsion motor, e.g., for an electrified motor vehicle, watercraft, aircraft, rail vehicle, robot, powerplant, or another mobile or stationary platform. When the rotary electric machine 12 is initially configured to operate at a first output voltage, e.g., 400-500V in a representative first voltage example, addition of the slot fill layer 44 and the electrostatic shielding layer 46 may be used to upgrade initial insulating capabilities of the rotary electric machine 12. This helps enable the rotary electric machine 12 of FIG. 1 to operate at a higher output voltage, e.g., a nominal 800-1000V in keeping with the non-limiting 400-500V example.

Figure 5:
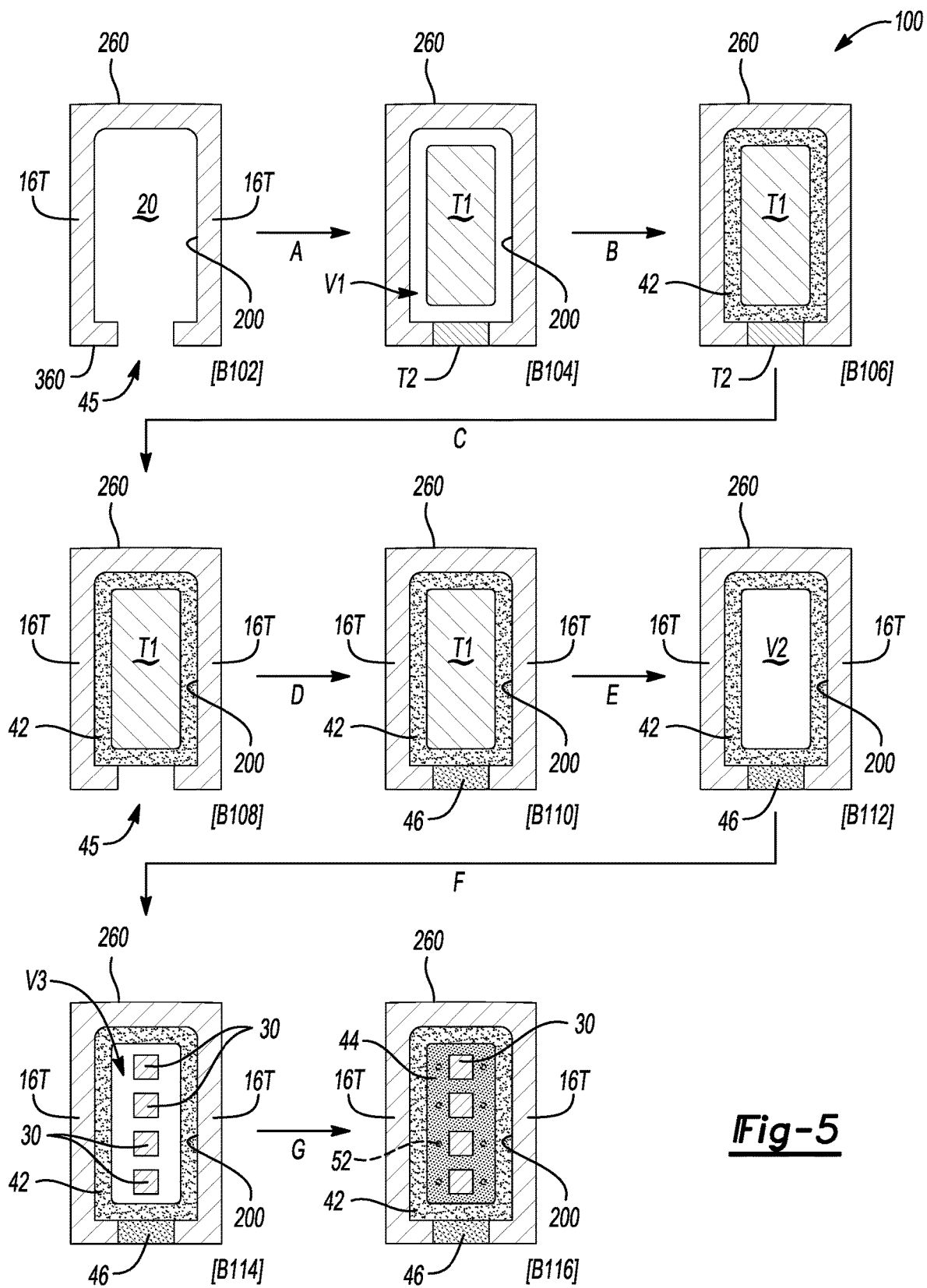
FIG. 5 describes a method for constructing a stator assembly using the molding materials described herein.

Embodiments may also be contemplated in which coolant channels 52 are disposed within the stator slots 20, e.g., in the conductors forming the stator windings 30 or in the surrounding materials 40, such as in the slot fill layer 44 as shown in FIGS. 3 and 5. Such coolant channels 52 are configured to connect to a coolant supply, e.g., the sump 22 and the pump 23 of FIG. 1. For example, the stator windings 30 could be constructed as hollow conductors, such that the coolant channels 52 are defined by the copper or other conductive materials thereof. Other approaches may include molding the coolant channels 52 into the various molding compounds used to construct the slot liner layer 42 and/or the slot fill layer 44. That is, molding the slot would allow the formation of the cooling channels 52 inside the molding compound as an alternative to more complicated methods such as the use of hollow conductors.

Various approaches could be used for this purpose, such as molding a dummy insert inside of the stator slot 20, with such an insert defining the shape and geometry of the coolant channels 52. Such coolant channels 52 remain when the dummy insert is later removed, as appreciated by those skilled in the art.

Referring briefly to FIG. 4, in lieu of the paper liners 49, the stator assembly 16 of FIGS. 1 and 2 may include electrically dielectric (or thermally conductive) spacers 50 disposed between the stator windings 30 and the stator yoke 16Y and/or stator teeth 16T (see FIG. 3). The spacers 50 may be constructed of resin inclusive of suspended particles, spheres, or balls of a dielectric/insulating material. Alternatively, a solid material with an adhesive coating could be applied to an outer surface 300 of the stator winding 30, or to the slot tooth wall 200 of FIG. 3, so as to ensure spacing of the stator winding 30 from the slot tooth wall 200, as well as to eliminate the need for the paper liners 49 or a first molding step. The maximum size of such spacers 50 should be less than the intended spacing of the stator winding 30 from the slot tooth wall 200 of FIG. 3 so as to enable sufficient clearance during insertion of the stator winding 30, but large enough to ensure that a minimum required spacing is maintained between the stator winding 30 and the stator core 16C of FIG. 2. Use of the spacers 50 enables more precise positioning of the conductors located inside the stator slots 20, in this instance the stator windings 30.

In some embodiments, the molding materials used for constructing the spacers 50 of FIG. 4 may be the same dielectric molding materials used to construct the slot liner layer 42. If a solid material is used to construct the spacers 50, an electrical insulator/dielectric material such as ceramic, glass, or a suitable polymer may be used. Exemplary materials for this purpose include oxides, nitrides, epoxies, phenolics, or thermoplastic polymers, by way of a few examples. Solid materials may require an adhesive to stick to the stator winding 30, e.g., epoxy, phenolic, acrylate, polyurethane, or another application suitable adhesive polymer. In the case of thermoplastics or partially-cured thermosets, the molding material may be sprayed onto the stator winding 30 in a molten/liquid state so that the molding materials properly adhere to the stator winding 30 after subsequent cooling.

Referring to FIG. 5, a method 100 is shown for constructing the stator assembly 16 of FIGS. 1 and 2 using the molding materials 40 of FIG. 3. Up to three different molding compounds may be used in as described generally above, and thus the described embodiment may be adapted for use in constructing the various alternative configurations described above. The method 100 is described relative to operation on one stator slot 20, as shown, with the description applying to the plurality of stator slots 20. That is, the manner in which one molds a given stator slot 20 is applicable to each of the remaining stator slots 20 of FIG. 2, and would be conducted simultaneously in most practical implementations.

Beginning with block B102, with "block" being a particular step or steps of a process sequence for implementing the method 100, an assembled stator core 16C (see FIG. 2) may be arranged on a work surface, with the stator slot 20 defined by two adjacent stator teeth 16T. Once so arranged, possibly with the assistance of fixtures or supports, the method 100 proceeds to block B104, as indicated by arrow A.

At block B104, one may insert a first molding tool T1 and a second molding tool T2 into the stator slot 20. The respective first and second molding tools T1 and T2 could be removable physical barriers that define, in conjunction with the slot tooth walls 200, a volume and geometry of a first void volume V1. The method 100 then progresses to block B106, as indicated by arrow B.

Block B106 entails filling the first void volume V1 with the dielectric molding compound of the slot liner layer 42, and thereafter allowing the molding compound to cure. Molding and subsequent steps may include, e.g., transfer molding, injection, pour casting, vacuum casting, etc., in various implementations. Resin may be injected into the respective first void volume V1 as a liquid and then hardened, as appreciated in the art. Curing may continue until the slot liner layer 42 has sufficiently solidified for the purpose of removing the second molding tool T2. The method 100 then proceeds to block B108 as indicated by arrow C.

At block B108, the second molding tool T2 is removed, thereby leaving slot opening 45. The slot 20 is in this stage lined with the slot liner layer 42, with the first molding tool T1 still in place. The method 100 then proceeds to block B110 as indicated by arrow D.

Still referring to FIG. 5, block B110 includes filling the slot opening 45 with the conductive materials described above for use as electrostatic shielding layer 46, and thereafter allowing the injected materials to cure. The method 100 then proceeds to block B112.

Block B112 entails removing the first molding tool T1. This action leaves a large void volume V2 in the stator slot 20, with slot liner layer 42 and the electrostatic shielding layer 46 enclosing the volume V2. The method 100 then proceeds to block B114.

At block B114 of FIG. 5, the conductors of the stator windings 30 are spaced inside of the second void volume V2 of block B112. While four conductors are shown in FIG. 5 at block B114, fewer or more conductors may be present in other embodiments. Insertion of the conductors leaves a third void volume V3 around the conductors, i.e., as empty space around the conductors. The method 100 proceeds to block B116 once the conductors of the stator windings 30 have been inserted into the stator slots 20 as shown.

Block B116 includes filling the third void volume V3 with the thermally conductive compound described above, thereby forming the slot fill layer 44. Optionally, one may simultaneously mold the coolant channels 52 inside of the slot fill layer 44, e.g., using removable tooling (not shown), in addition to or in lieu of using potentially expensive hollow conductors for the stator windings 30.

In a more generalized implementation, the method for insulating the stator assembly 16 for the rotary electric machine 12 may include inserting a molding tool into stator slots 20 of a stator core 16C of the stator assembly 16 to thereby define at least one void volume within the stator slots 20, e.g., the first void volume V1 described above, between the molding tool, e.g., the second molding tool T2 of FIG. 5, and slot tooth walls 200 of an adjacent pair of stator teeth 16T of the stator core 16C. The void volume is filled with the dielectric molding compound, which is then cured to form the slot liner layer 42 adjacent to the tooth walls 200. The molding tool is thereafter removed from the stator slot 20. Such a method continues with filling the slot opening 45 void between the adjacent pair of the stator teeth 16T with an electrically-conductive resin to form the electrostatic shielding layer 46 of FIG. 3.

In some embodiments, such as the aforementioned 400V to 800V retrofit example, the stator slots 20 are occupied by conductive stator windings 30 before inserting the molding tool, and before injecting the described dielectric material. The stator windings 30 could be wrapped in the paper liners 49 in some instances, again before inserting such a molding tool. An implementation may include positioning the dielectric spacers 50 of FIG. 4 between the stator windings 30 and the stator yoke 16Y.

In manufacturing processes in which the void volume includes the first void volume V1 adjacent to the slot tooth walls 200 and the second void volume V2 adjacent to the first void volume V1, the method may include filling the second void volume V2 with the previously described thermally-conductive molding material, with the second void volume V2 being adjacent to the slot liner layer 42. This is followed by curing the thermally-conductive molding material to form the slot fill layer 44, and then removing the molding tool from the stator slot 20, in this case molding tool T2. The various possible implementations of this method could include forming the coolant channel(s) 52 of FIG. 3 within the stator slot 20, with the coolant channel(s) 52 configured to connect to a supply of the heat transfer fluid 21 shown in FIG. 1.

The present teachings are intended to enable a slot insulation system and accompanying methodology for filling a stator slot 20 of the above-described stator assembly 16 with the multiple different molding compounds of the above-described multi-layer molding materials 40. Collectively, the multi-layer molding materials 40 reduce the transmission line phenomenon referred to as the Corona effect, in which localized electric field in proximity to the stator slots 20 may cause ionization, and thus partial discharge. The layered approach to molding the stator slots 20 provides application-tailored levels of ground wall insulation, improved thermal conductivity in designed regions of the stator slots 20 and surrounding ferrous material of the stator core 16C, and, in some configurations, electrostatic shielding proximate the airgap 17 between the stator assembly 16 and the rotor assembly 14, as depicted in FIG. 1.

Aspects of the present disclosure may be selectively implemented on existing motor hardware for the purpose of increasing excitation voltage, as noted above, without insulation failure, and without requiring over-design of the insulation system of the stator assembly 16. The resulting construction of the rotary electric machine 12 of FIG. 1 or similar configurations thereof thus enjoy reduced operating temperatures and rotor parasitic voltages. Moreover, the disclosed method 100 may help reduce the complexity that otherwise might otherwise be present for upgrading an HV insulation system of the rotary electric machine 12, thus lowering costs of manufacturing and possibly avoiding maintenance costs associated with premature insulation failure. These and other attendant benefits of the present teachings will be readily understood by those skilled in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A stator assembly comprising:
 a stator yoke defining a center opening, and having a longitudinal center axis, an outer diameter surface, and an inner diameter surface;
 a plurality of stator teeth connected to the stator yoke to form a stator core in conjunction therewith, the stator teeth projecting radially into the center opening toward the longitudinal center axis, and collectively defining a plurality of stator slots, wherein the stator slots extend radially from the inner diameter surface of the stator core yoke toward the outer diameter surface of the stator core yoke;
 conductive stator windings disposed within the stator slots;

dielectric spacers disposed between the stator windings and the stator yoke, wherein the dielectric spacers include suspended particles, spheres, or balls of a dielectric material; and a molding material disposed within and substantially filling a volume of the stator slots around the stator windings, and providing a predetermined thermoelectrical performance level in different regions of the stator slots, including two or more of an electrical insulation level, a thermal conductivity level, or an electrostatic shielding level.

2. The stator assembly of claim 1, wherein the molding material includes a slot liner layer and a slot fill layer, the slot liner layer being adjacent to and in contact with a stator wall of the stator teeth, and constructed of a dielectric molding compound, and the slot fill layer surrounding the stator windings and constructed of a thermally-conductive molding compound.

3. The stator assembly of claim 2, wherein the dielectric molding compound of the slot liner layer is constructed of a first thermosetting polymer material having a dielectric strength of at least about 20 kV/mm, and the thermally-conductive molding compound of the slot fill layer is constructed of a second thermosetting polymer material containing thermally-conductive particles and/or fiber fill materials.

4. The stator assembly of claim 3, wherein the dielectric molding compound of the slot liner layer has a thermal conductivity of about 0.75 W/mK to about 10 W/mK, and the slot fill layer has a thermal conductivity of at least about 1 W/mK.

5. The stator assembly of claim 2, wherein each adjacent pair of the stator teeth is separated by a respective slot opening, and the molding material includes an electrostatic shielding layer disposed within the respective slot opening and constructed of an electrically-conductive material.

6. The stator assembly of claim 2, wherein the stator assembly is characterized by an absence of stator slot openings between each adjacent pair of the stator teeth, such that the stator slots are closed.

7. The stator assembly of claim 1, wherein the stator assembly includes an electrically-insulating paper liner positioned adjacent to the stator teeth within each respective one of the stator slots.

8. The stator assembly of claim 1, further comprising coolant channels disposed within one or more of the stator slots, wherein the coolant channels are configured to connect to a supply of a heat transfer fluid.

9. The stator assembly of claim 1, wherein the molding material includes a dielectric molding compound, a thermally-conductive molding compound, and an electrically-conductive resin material, the dielectric molding compound being arranged between tooth walls of the adjacent stator teeth and the thermally-conductive molding compound, the thermally-conductive molding compound being arranged between the dielectric molding compound and the stator windings, and the electrically-conductive resin material being arranged in a slot opening defined between an adjacent pairs of the stator teeth.

10. A method for insulating a stator assembly for a rotary electric machine, comprising:
inserting a first molding tool into a stator slot of a stator core of the stator assembly to thereby define a first void volume between the first molding tool and tooth walls of an adjacent pair of stator teeth of the stator core;
filling the first void volume with a dielectric molding compound;

curing the dielectric molding compound to form a slot liner layer adjacent to the tooth walls;
removing the first molding tool from the stator slot to form a second void volume within the stator slot;
inserting conductive stator windings into the second void volume;
filling the second void volume with a thermally-conductive molding compound; and
curing the thermally-conductive molding compound to form a slot fill layer surrounding the conductive stator windings.

11. The method of claim 10, further comprising:
filling a slot opening between the adjacent pair of stator teeth with an electrically-conductive resin; and
curing the electrically-conductive resin to form an electrostatic shielding layer.

12. The method of claim 11, further comprising:
inserting a second molding tool into the slot opening before filling the first void volume with the dielectric molding compound; and
removing the second molding tool from the slot opening after curing the dielectric molding compound and before filling the slot opening with the electrically-conductive resin.

13. The method of claim 10, wherein the dielectric molding compound includes a thermosetting polymer material having a dielectric strength of at least about 20 kV/mm.

14. The method of claim 13, wherein the dielectric molding compound has a thermal conductivity of about 0.75 W/mK to about 10 W/mK.

15. The method of claim 10, wherein the thermally-conductive molding compound includes a thermosetting polymer material having a thermal conductivity of at least about 1/mK, and containing conductive particle and/or fiber fill materials.

16. The method of claim 10, further comprising forming at least one coolant channel within the stator slot, wherein the at least one coolant channel is configured to connect to a supply of a heat transfer fluid.

17. An electrical system comprising:
a power inverter module connectable to a direct current (DC) voltage bus, and operable for outputting an alternating current (AC) output voltage in response to a DC input voltage;
an AC voltage bus connected to the power inverter module; and
a rotary electric machine connected to the AC voltage bus, the rotary electric machine having a rotor assembly surrounded by a stator assembly, the stator assembly comprising:
a stator yoke defining a center opening, and having a longitudinal center axis, an outer diameter surface, and an inner diameter surface;
a plurality of stator teeth connected to the stator yoke to form a stator core, the stator teeth projecting radially into the center opening toward the longitudinal center axis and collectively defining a plurality of stator slots, wherein the stator slots extend radially from the inner diameter surface toward the outer diameter surface of the stator yoke;
conductive stator windings disposed within the stator slots;
dielectric spacers disposed between the stator windings and the stator yoke, wherein the dielectric spacers include suspended particles, spheres, or balls of a dielectric material; and a molding material disposed within and substantially filling the stator slots around the stator windings, and providing a predetermined thermoelectrical performance level at different regions of the stator slots, including two or more of electrical insulation level, a thermal conductivity level, or an electrostatic shielding level, wherein the molding material includes a slot liner layer adjacent to and in contact with a stator wall of the stator teeth, the slot liner layer being constructed of a dielectric molding compound having a dielectric strength of at least about 20 kV/mm, and a slot fill layer surrounding the stator windings, wherein the slot fill layer is constructed of a thermally-conductive molding compound having a thermal conductivity of at least about 1 W/mK.

18. The electrical system of claim 17, wherein each adjacent pair of the stator teeth is separated by a slot opening, and the molding material includes an electrostatic shielding layer disposed within the slot opening and constructed of an electrically-conductive material.

19. The electrical system of claim 17, wherein the electrical system is part of an electrified vehicle, and wherein the rotary electric machine is a propulsion motor for the electrified vehicle.

20. The electrical system of claim 17, wherein the molding materials are filled with a solid particle material, fibers, or nitrides as a structural reinforcement material.

* * * * *